(12) United States Patent
Mentesana

(10) Patent No.: US 7,119,478 B1
(45) Date of Patent: Oct. 10, 2006

(54) PIEZOELECTRIC STEP-MOTION ACTUATOR

(75) Inventor: Charles P. Mentesana, Leawood, KS (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 133 days.

(21) Appl. No.: 10/776,968

(22) Filed: Feb. 11, 2004

(51) Int. Cl.
H01L 41/08 (2006.01)

(52) U.S. Cl. ..................................... 310/328
(58) Field of Classification Search ................. 310/328
See application file for complete search history.

(56) References Cited

U.S. PATENT DOCUMENTS

| | | | | |
|---|---|---|---|---|
| 3,297,889 | A | * | 1/1967 | Breskend .................... 310/315 |
| 4,257,324 | A | * | 3/1981 | Stefansson et al. ...... 101/93.01 |
| 5,049,775 | A | | 9/1991 | Smits .......................... 310/328 |
| 5,062,019 | A | * | 10/1991 | Morisawa ................. 360/78.05 |
| 5,485,405 | A | | 1/1996 | Wilson ....................... 364/559 |
| 5,973,441 | A | | 10/1999 | Lo et al. ..................... 310/330 |
| 6,222,306 | B1 | | 4/2001 | Groult et al. .............. 310/337 |
| 6,433,452 | B1 | * | 8/2002 | Graham ...................... 310/103 |
| 2001/0010526 | A1 | * | 8/2001 | Barinaga .................... 347/28 |

FOREIGN PATENT DOCUMENTS

JP 01008880 A * 1/1989

OTHER PUBLICATIONS

T. Higuchi, Y. Hojjat, and M. Watanabe, "Micro Actuators Using Recoil of an Ejected Mass", Proc. IEEE Micro Robots and Teleoperators Workshop, Hyannis, MA (Nov. 9-11, 1987).
J. Judy, D. Polla, and W. Robbins, "A Linear Piezoelectric Stepper Motor With Submicrometer Step Size and Centimeter Travel Range", IEEE Transactions on Ultrasonics, Ferroelectrics, and Frequency Control, vol. 37, No. 5 (Sep. 1990).

* cited by examiner

Primary Examiner—Darren Schuberg
Assistant Examiner—J. Aguirrechea
(74) Attorney, Agent, or Firm—Hovey Williams LLP

(57) ABSTRACT

A step-motion actuator using piezoelectric material to launch a flight mass which, in turn, actuates a drive pawl to progressively engage and drive a toothed wheel or rod to accomplish stepped motion. Thus, the piezoelectric material converts electrical energy into kinetic energy of the mass, and the drive pawl and toothed wheel or rod convert the kinetic energy of the mass into the desired rotary or linear stepped motion. A compression frame may be secured about the piezoelectric element and adapted to pre-compress the piezoelectric material so as to reduce tensile loads thereon. A return spring may be used to return the mass to its resting position against the compression frame or piezoelectric material following launch. Alternative embodiment are possible, including an alternative first embodiment wherein two masses are launched in substantially different directions, and an alternative second embodiment wherein the mass is eliminated in favor of the piezoelectric material launching itself.

18 Claims, 3 Drawing Sheets

PIEZOELECTRIC STEP-MOTION ACTUATOR

FEDERALLY SPONSORED RESEARCH OR DEVELOPMENT PROGRAM

The present invention was developed with support from the U.S. government under Contract No. DE-AC04-01 AL66850 with the U.S. Department of Energy. Accordingly, the U.S. government has certain rights in the present invention.

BACKGROUND OF THE INVENTION

1. Field of the Invention

The present invention relates broadly to stepper motors or other step-motion actuators and mechanisms for accomplishing stepped motion. More particularly, the present invention concerns a stepper motor or other step-motion actuator that uses piezoelectric material to launch one or more flight masses, which, in turn, actuate a drive pawl to progressively engage and drive a toothed wheel or rod to accomplish stepped motion. Thus, the piezoelectric material converts electrical energy into kinetic energy of the masses, and the drive pawl and toothed wheel or rod convert the kinetic energy of the masses into the desired rotary or linear stepped motion.

2. Description of the Prior Art

It is often desirable to use stepper motors or other step-motion actuators to achieve highly predictable and controllable stepped motion, particularly in micro- and nano-sized mechanisms. To that end, a variety of electrostatic, electromagnetic, and piezoelectric concepts have been devised to accomplish stepped motion within such small-scale actuators. In general, however, step-motion actuators using these concepts are in the early stages of development and still suffer from a number of problems and disadvantages. For example, energy density in these step-motion actuators is typically too low to be useful. Also, none of the current concepts have proven to be universally applicable.

Due to the above-identified and other problems and disadvantages encountered in the prior art, a need exists for an improved step-motion actuator.

SUMMARY OF THE INVENTION

The present invention overcomes the above-described and other problems and disadvantages in the prior art with an improved step-motion actuator adapted and operable to convert electrical energy into kinetic energy through piezoelectric action, and then convert the kinetic energy into stepped motion.

In a preferred first embodiment, the step-motion actuator takes the form of a stepper motor broadly comprising a flight actuator; a drive pawl; a ratchet wheel; a hold pawl; and a return spring. The flight actuator includes a piezoelectric stack; a compression frame; a flight mass; and an arm. The flight actuator converts electrical energy in the form of a fast-rising voltage applied to the piezoelectric stack, into kinetic energy in the form of movement of the mass. The piezoelectric stack includes a plurality of piezoelectric elements and is held within the compression frame which pre-compresses the piezoelectric stack to prevent or minimize the effects of tensile loads thereon. The mass is held physically against the compression frame or piezoelectric stack by the arm until the mass is launched by the piezoelectric acceleration action of the piezoelectric stack. The arm may be a spring arm or a substantially inflexible pivot arm, though in the latter case the return spring is be needed to return the pivot arm and mass after launching to the initial or rest position.

The drive pawl mechanically transfers the kinetic energy of the moving arm to the ratchet wheel. The drive pawl presents a first drive pawl end pivotably coupled with the arm, and a second end adapted to engage the ratchet wheel. The ratchet wheel presents a plurality of teeth evenly spaced circularly about a periphery of the ratchet wheel. It is these teeth that the second end of the drive pawl engages.

The hold pawl prevents the ratchet wheel from moving in reverse when the mass is launched and the drive pawl is disengaged from the ratchet wheel, while allowing the ratchet wheel to move forward during the return. The hold pawl presents a second hold pawl end adapted to engage the teeth of the ratchet wheel in substantially the same manner as the second drive pawl end of the drive pawl.

In operation, the fast-rising voltage is applied to the piezoelectric stack, causing it to accelerate. This motion is, in turn, transferred to the mass, launching it away from piezoelectric stack. The arm coupled with the mass also moves, drawing the drive pawl with it. The hold pawl maintains engagement with the teeth while the drive pawl is withdrawn, thereby preventing backward movement of the ratchet wheel. When the drive pawl reaches its zenith, it engages a particular different tooth that is at least one removed from the previously engaged tooth. The return spring pulls the arm and mass back to their rest positions, thereby driving the drive pawl against the particular tooth and causing the ratchet wheel to advance in a forward direction.

Thus, it will be appreciated that the step-motion actuator of the present invention provides a number of substantial advantages over the prior art, including, for example, a higher, more useful energy density not achieved in prior art step-motion actuator concepts. Furthermore, the flight actuator mechanism of the present invention is substantially more flexible and adaptable in design and therefore more universally applicable than prior art step-motion actuator concepts.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

With reference to the figures, a step-motion actuator 10 is described, shown, and otherwise disclosed herein in accordance with a preferred embodiment of the present invention. Broadly, the step-motion actuator 10 converts electrical energy into kinetic energy through piezoelectric action, and then converts the kinetic energy into stepped motion. Possible uses and applications for the step-motion actuator 10 include, for example, driving LiGA-produced micro-sized stronglinks or other micro-mechanisms. It should be noted, however, that the step-motion actuator 10 of the present invention is not limited with regard to size or fabrication method, and may therefore be used to provide stepped rotary or linear motion on substantially any scale and for substantially any torque, speed, or step-size specifications.

Figure 1:
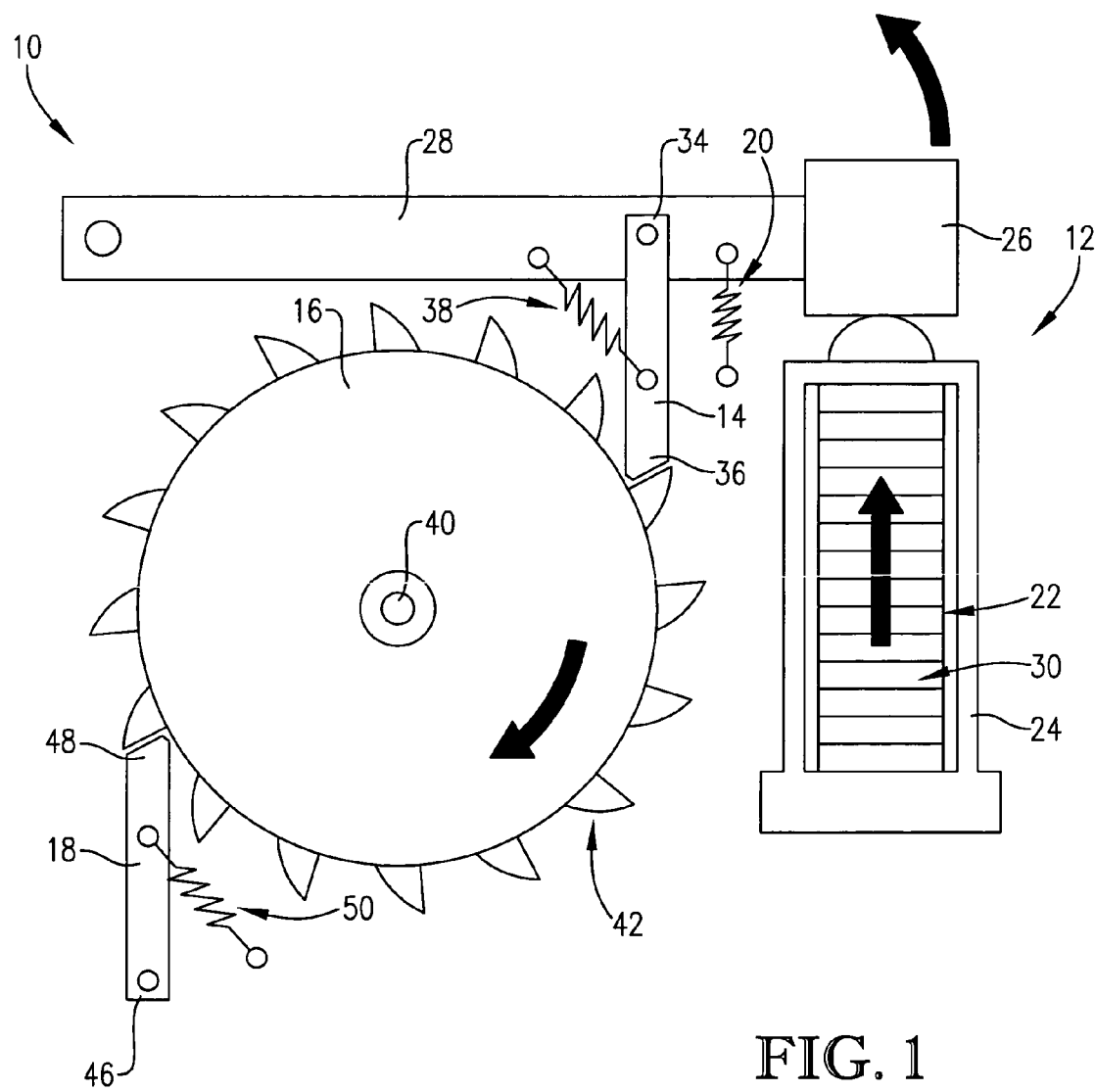
FIG. 1 is a schematic depiction of a preferred first embodiment of the piezoelectric step-motion actuator of the present invention.
Figure 2:
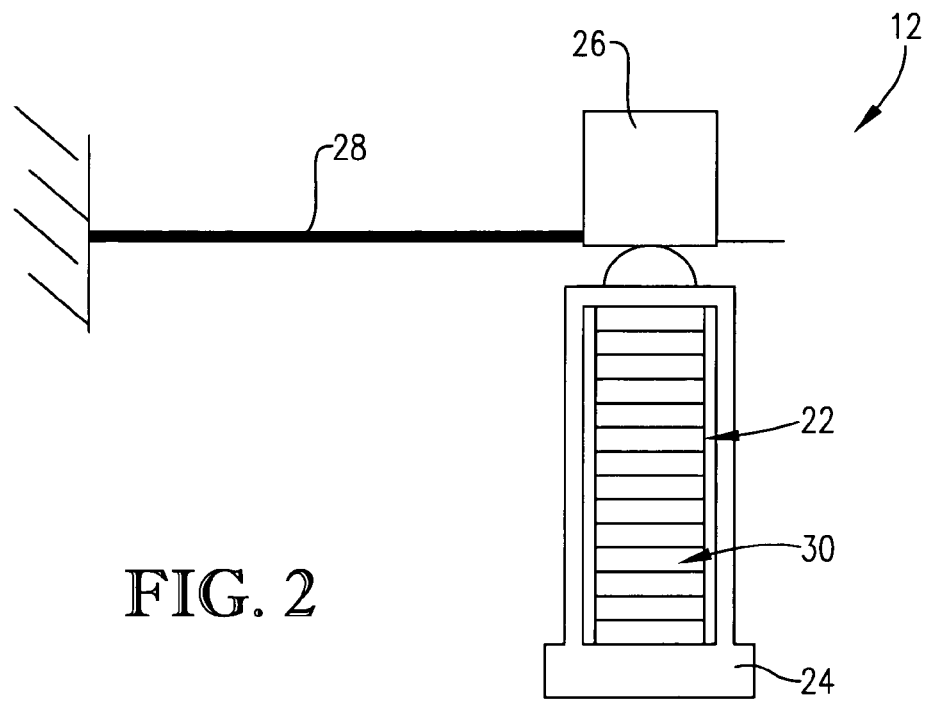
FIG. 2 is a depiction illustrating the concept and principle of operation of a flight actuator component of the step-motion actuator shown in FIG. 1, wherein the flight actuator is shown in an initial or rest position.
Figure 3:
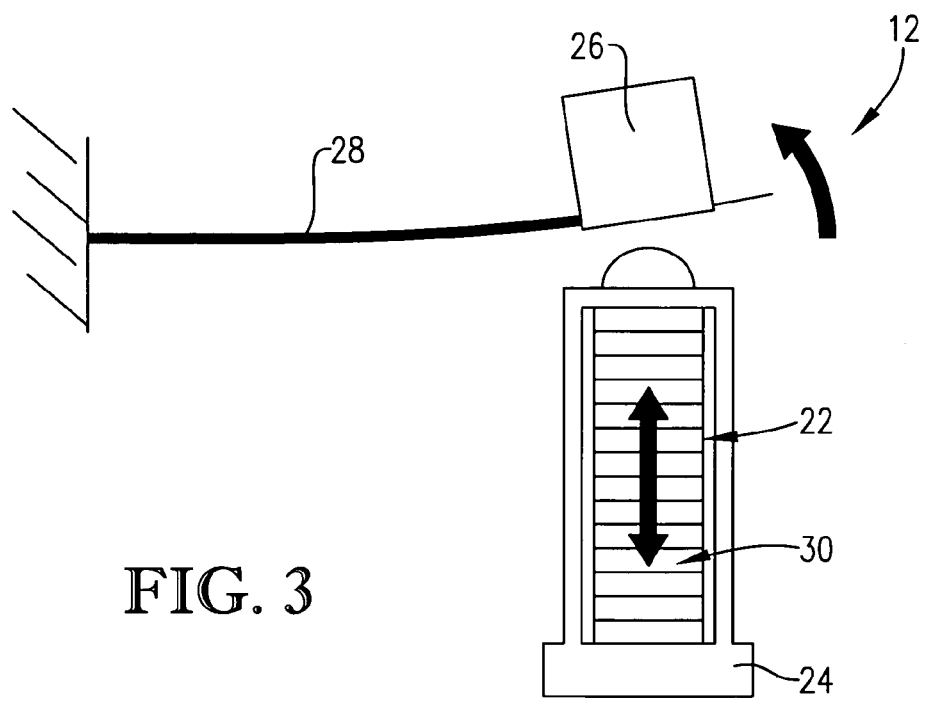
FIG. 3 is a depiction of the flight actuator component of the FIG. 2, wherein the flight actuator is shown in a launched or actuated position.

In a preferred first embodiment shown in FIG. 1, the step-motion actuator 10 is presented in the form of a stepper motor broadly comprising a flight actuator 12; a drive pawl 14; a ratchet wheel 16; a hold pawl 18; and a return spring 20. The flight actuator 12 may be implemented in any of variety of different ways, alternative examples of which are set forth below. The basic concept of the flight actuator 12 is shown in FIGS. 2 and 3, wherein the flight actuator 12 includes a piezoelectric stack 22; a compression frame 24; a flight mass 26; and an arm 28. The flight actuator 12 is adapted and operable to convert electrical energy in the form of a fast-rising voltage applied to the piezoelectric stack 22 into kinetic energy in the form of movement of the mass 26. The piezoelectric stack 22 includes a plurality of piezoelectric elements 30 constructed of a material that exhibits piezoelectric behavior or action when subjected to the aforementioned voltage. The piezoelectric stack 22 is held within the compression frame 24 which pre-compresses the piezoelectric stack 22 to prevent or minimize the effects of tensile loads on the piezoelectric stack 22 (ceramic materials are generally weak in tension). The compression frame 24 can take any suitable form, including, for example, a length of wire wrapped about the piezoelectric stack 22, or one or more solid end pieces clamped or otherwise secured over or around the piezoelectric stack 22. The mass 26 is held physically against or otherwise toward the compression frame 24 or piezoelectric stack 22 by the arm 28 until the mass 26 is accelerated or launched by the piezoelectric action of the electrically stimulated piezoelectric stack 22. The arm 28 may be a spring arm or a substantially inflexible pivot arm, though in the latter case the return spring 20 is be needed to return the pivot arm 28 and mass 26 after launching to the initial or rest position.

In exemplary use and operation, the arm 28 initially holds the mass 26 against or otherwise toward the compression frame 24 and piezoelectric stack 22, as shown in FIG. 2. Then the fast-rising voltage is applied to the piezoelectric stack 22, causing it to accelerate. This motion is, in turn, transferred to the mass 26, launching it away from the piezoelectric stack 22, as shown in FIG. 3. As the mass 26 moves, its kinetic energy is transferred to the arm 28. Lastly, mass 26 returns to its initial rest position against the compression frame 24, ready for the next iteration of the aforementioned steps.

Referring again to FIG. 1, the drive pawl 14 mechanically transfers the kinetic energy of the moving arm 28 to the ratchet wheel 16. The drive pawl 14 presents a first drive pawl end 34 and a second drive pawl end 36, with the first end 34 being pivotably coupled with the arm 28 and the second end 36 being adapted to engage the ratchet wheel 16. A drive pawl spring 38 extends between the arm 28 and the drive pawl 14 to move and maintain the second end 36 in position to properly engage the ratchet wheel 16. Alternatively, the drive pawl spring 38 could be eliminated if the drive pawl 14 is itself a spring arm.

The ratchet wheel 16 is mounted on an axle 40 or other linkage to transfer the step motion of the step-motion actuator 10 as desired. The ratchet wheel 16 presents a plurality of teeth 42 evenly spaced circularly about a periphery of the ratchet wheel 16. It is these teeth 42 that the second end of the drive pawl 24 engages.

The hold pawl 18 prevents the ratchet wheel 16 from moving in reverse when the mass 26 is launched and the drive pawl 14 is disengaged from the ratchet wheel 16, while also allowing the ratchet wheel 16 to move forward during the return stroke of the drive pawl 14. The hold pawl 18 presents a first hold pawl end 46 and a second hold pawl end 48, with the first end 46 being pivotably coupled with an underlying structure and the second end 48 being adapted to engage the teeth 42 of the ratchet wheel 16 in substantially the same manner as the second drive pawl end 36 of the drive pawl 14. A hold pawl spring 50 extends between the hold pawl 18 and the underlying support structure to move and maintain the second end 48 in position to properly engage the teeth 42. Alternatively, the hold pawl spring 50 could be eliminated if the hold pawl 18 is itself a spring arm.

In exemplary use and operation, the preferred first embodiment of the step-motion actuator 10 of the present invention functions as follows. The return spring 20 holds the mass 26 against or otherwise toward the compression frame 24 and piezoelectric stack 22. The fast-rising voltage is applied to the piezoelectric stack 22, causing it to accelerate. This motion is, in turn, transferred to the mass 26, launching it away from the piezoelectric stack 22. The arm 28 coupled with the mass 26 also moves, drawing the drive pawl 14 with it. The hold pawl 18 maintains engagement with the teeth 42 while the drive pawl 14 is withdrawn, thereby preventing backward movement of the ratchet wheel 16. The drive pawl spring 38 moves and maintains the drive pawl 14 against the teeth 42 of the ratchet wheel 16 such that when the drive pawl 14 reaches its zenith, it engages a particular different tooth that is at least one removed from the previously engaged tooth. The return spring 20 pulls the arm 28 and mass 26 back to their rest positions, thereby driving the drive pawl 14 against the particular tooth and causing the ratchet wheel 16 to advance in a forward direction. The hold pawl spring 50 moves and maintains the hold pawl 18 in proper position during this forward motion of the ratchet wheel 16. This completes a single step motion of the step-motion actuator 10.

As mentioned, the flight actuator and step-motion actuator of the present invention may be implemented in any of a variety of ways. It will be appreciated, for example, that the piezoelectric stack may be constructed from a single piezoelectric element rather than a plurality of piezoelectric elements. Furthermore, the piezoelectric element(s) can take substantially any desired shape, such as, for example, cubes, bars, rods, or disks. Additionally, unimorph or bimorph elements may be used for low mass/low power applications. Unimorph elements are comprised of a single sheet or bar of piezoelectric material bonded to a metal sheet or bar. Bimorph elements are comprised of two sheets of piezoelectric material bonded to either side of a metal inter-layer. Additionally, other actuator types, such as, for example, piezoelectric-driven mechanical amplifiers, may be used or adapted for use in the step-motion actuator of the present invention.

Figure 4:
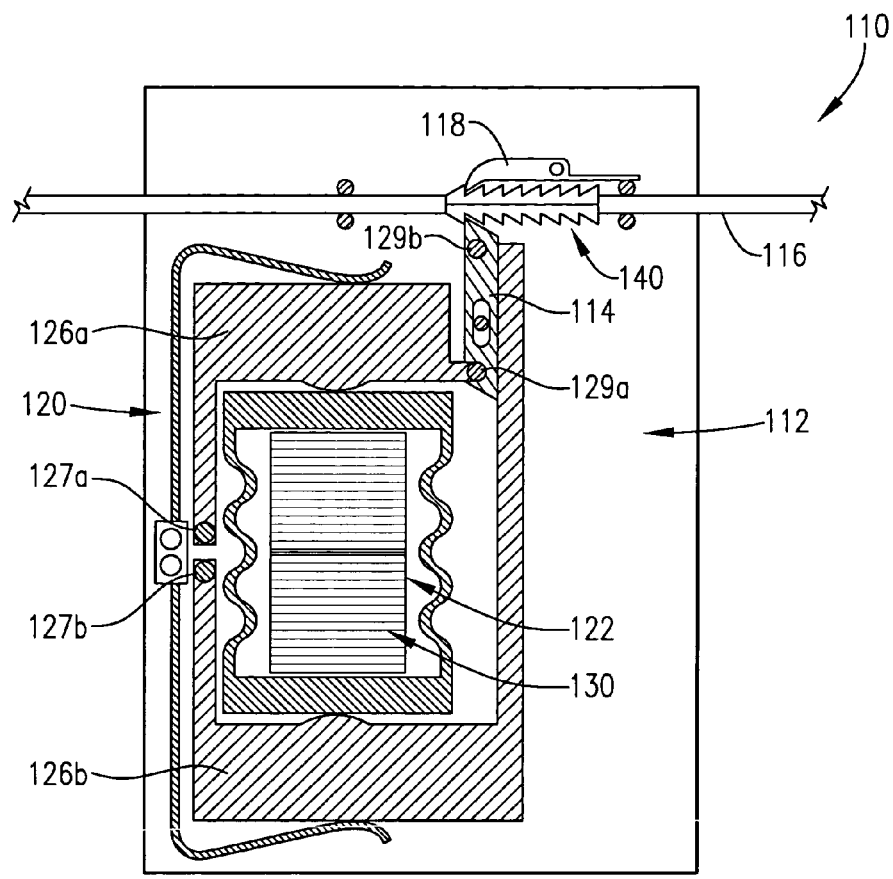
FIG. 4 is a schematic depiction of an alternative second embodiment of the step-motion actuator of the present invention.

An alternative second embodiment of the step-motion actuator 110 is shown in FIG. 4, wherein two flight masses 126a, 126b are launched in substantially different directions from either end of the piezoelectric stack 122. Whereas the above-described preferred first embodiment of the step-motion actuator 10 accomplished rotational motion, the alternative second embodiment of the step-motion actuator 110 is adapted to accomplish linear motion. The step-motion actuator 110 continues to comprise the flight actuator 112; the drive pawl 114; the hold pawl 118; and the return spring 120. The ratchet wheel 16 of the preferred first embodiment is replaced with a linear rod 116 presenting the plurality of teeth 140. The return spring 120 holds the first mass 126a against a first end of the compression frame and the second mass 126b against an opposite second end of the compression frame. The first mass 126a is pivotably secured, by, e.g., a linkage, at a first point 127a to the underlying structure, and similarly pivotably secured at a second point 129a to the first end 134 of the drive pawl 114. The second mass 126b is similarly pivotably secured, by, e.g., a linkage, at a first point 127b to the underlying structure, and at a second point 129b to the second end 136 of the drive pawl 114.

In operation, the fast-rising voltage is applied to the piezoelectric elements 130 of the piezoelectric stack 122, causing it to accelerate. The piezoelectric stack 122 is mounted so as to allow the acceleration to manifest at both its first and second ends. This launches the first mass 126a and the second mass 126b in opposite directions. Each of the masses 126a, 126b pivot about the first points 127a, 127b, causing the drive pawl 114 to pivot about the second points 129a, 129b and to withdraw from the teeth 140. The hold pawl 118 maintains engagement with the teeth 140 while the drive pawl 114 is withdrawn, thereby preventing backward movement of the linear rod 116. The return spring 120 then begins forcing the masses 126a, 126b back against the compression frame, which causes the drive pawl 114 to engage a particular different tooth that is at least one removed from the previously engaged tooth. As the masses 126a, 126b are forced back to their initial or rest positions, the drive pawl 114 is driven against the particular tooth and causes the linear rod 116 to advance. This completes a single step motion of the stepper motor 110.

This alternative second embodiment of the stepper motor 110 provides a number of specific advantages, including, for example, that shock loads on the stepper motor 110 are less likely to cause an inadvertent advancement of the linear rod 116. This is because the shock load is likely to be unidirectional and therefore unlikely to result in the flight masses 126a, 126b moving in the required different directions. Furthermore, whereas in the preferred first embodiment an extremely stiff or heavy underlying structure is necessary to support the piezoelectric stack 22 and direct most or all of the accelerative energy in the direction of the single flight mass 26, the piezoelectric stack 122 of the alternative second embodiment accelerates outwardly in both directions from its center. A virtual infinite impedance is thereby established at the center of the piezoelectric stack 122 such that little or no additional underlying support structure is necessary, thereby decreasing cost and weight.

Figure 5:
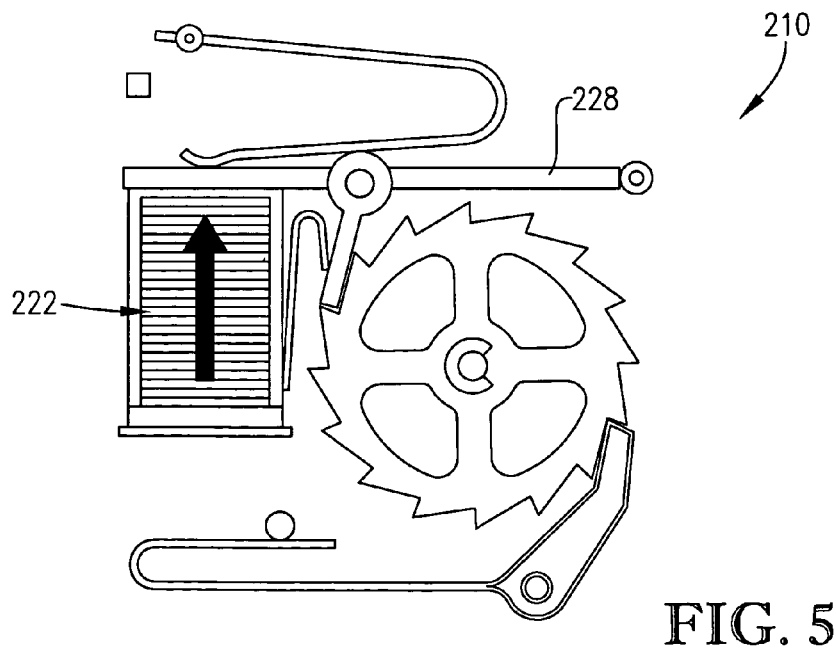
FIG. 5 is a schematic depiction of an alternative third embodiment of the step-motion actuator of the present invention.

An alternative third embodiment of the step-motion actuator 210 is shown in FIG. 5, wherein the piezoelectric stack 222 itself serves as the flight mass in that the piezoelectric stack 222 launches itself and transfers its kinetic energy directly to the arm 228. This alternative third embodiment allows for a reduced number of parts and correspondingly reduced cost and weight.

From the preceding description, it will be appreciated that the step-motion actuator of the present invention provides a number of substantial advantages over the prior art, including, for example, a higher, more useful energy density not achieved in prior art step-motion actuator concepts. Furthermore, the flight actuator mechanism of the present invention is substantially more flexible and adaptable and therefore more universally applicable than prior art step-motion actuator concepts.

Although the invention has been described with reference to the preferred embodiments illustrated in the attached drawings, it is noted that equivalents may be employed and substitutions made herein without departing from the scope of the invention as recited in the claims. For example, as illustrated by the various embodiments disclosed herein, the step-motion actuator is not limited with regard to size or fabrication method, and may therefore be used to provide stepped rotary or linear motion on substantially any scale and for substantially any torque, speed, or step-size specifications, all of which may be varied by choice of piezoelectric stack characteristics, mass size, spring constants, and other design variables.

Having thus described the preferred embodiment of the invention, what is claimed as new and desired to be protected by Letters Patent includes the following:

1. A step-motion actuator comprising:
    a plurality of teeth;
    a movable drive pawl positioned so as to engage one or more of the teeth in a forward direction;
    a piezoelectric element adapted to convert electrical energy into kinetic energy in the form of movement of the drive pawl, causing the drive pawl to drive against the one or more teeth to accomplish a step-motion in the forward direction;
    a compression frame secured about the piezoelectric element and adapted to pre-compress the piezoelectric element so as to reduce tensile loads thereon; and
    a mass secured to an arm, wherein the mass is spring-biased toward the compression frame and the piezoelectric element such that the piezoelectric element converts electrical energy into kinetic energy in the form of movement of the mass and the arm,
    wherein the drive pawl is coupled with the arm such that movement of the mass and the arm causes movement of the drive pawl.

2. The step-motion actuator as set forth in claim 1, further including a movable hold pawl positioned so as to engage one or more of the teeth in a reverse direction during movement of the drive pawl.

3. The step-motion actuator as set forth in claim 2, further including a hold pawl spring coupled with the hold pawl and adapted to move and maintain the hold pawl in position to engage the one or more teeth.

4. A step-motion actuator comprising:
    a plurality of teeth;
    a piezoelectric element adapted to convert electric energy to kinetic energy;
    a compression frame secured about the piezoelectric element and adapted to pre-compress the piezoelectric element so as to reduce tensile loads thereon;
    a mass secured to an arm, wherein the mass is spring-biased toward the compression frame and the piezoelectric element such that the piezoelectric element converts electrical energy into kinetic energy in the form of movement of the mass and the arm;
    a movable drive pawl coupled with the arm and positioned so as to engage one or more of the teeth in a forward direction, wherein movement of the mass and the arm causes movement of the drive pawl, and wherein the drive pawl drives against the one or more teeth to accomplish a step-motion in the forward direction; and a movable hold pawl positioned so as to engage one or more of the teeth in a reverse direction during movement of the drive pawl.

5. The step-motion actuator as set forth in claim 4, wherein the plurality of teeth are arranged circularly upon a wheel so as to accomplish a rotary step-motion.

6. The step-motion actuator as set forth in claim 4, wherein the plurality of teeth are arranged linearly upon a rod so as to accomplish linear step-motion.

7. The step-motion actuator as set forth in claim 4, further including a drive pawl spring coupled with the drive pawl and adapted to move and maintain the drive pawl in a position to engage the one or more teeth.

8. The step-motion actuator as set forth in claim 4, further including a hold pawl spring coupled with the hold pawl and adapted to move and maintain the hold pawl in position to engage the one or more teeth.

9. A step-motion actuator comprising:
a plurality of teeth;
a piezoelectric element adapted to convert electric energy to kinetic energy;
a compression frame secured about the piezoelectric element and adapted to pre-compress the piezoelectric element so as to reduce tensile loads thereon;
a first mass spring-biased toward a first end of the compression frame and the piezoelectric element;
a second mass spring-biased toward a second end of the compression frame and the piezoelectric element, wherein the piezoelectric element converts electrical energy into kinetic energy in the form of movement of the first mass and the second mass in substantially different directions;
a movable drive pawl coupled with the first mass and the second mass and positioned so as to engage one or more of the teeth in a forward direction, wherein movement of the first mass and the second mass causes movement of the drive pawl, and wherein the drive pawl drives against the one or more teeth to accomplish a step-motion in the forward direction; and
a movable hold pawl positioned so as to engage one or more of the teeth in a reverse direction during movement of the drive pawl.

10. The step-motion actuator as set forth in claim 9, wherein the plurality of teeth are arranged circularly upon a wheel so as to accomplish a rotary step-motion.

11. The step-motion actuator as set forth in claim 9, wherein the plurality of teeth are arranged linearly upon a rod so as to accomplish linear step-motion.

12. The step-motion actuator as set forth in claim 9, further including a drive pawl spring coupled with the drive pawl and adapted to move and maintain the drive pawl in a position to engage the one or more teeth.

13. The step-motion actuator as set forth in claim 9, further including a hold pawl spring coupled with the hold pawl and adapted to move and maintain the hold pawl in position to engage the one or more teeth.

14. A step-motion actuator comprising:
a plurality of teeth;
a piezoelectric element adapted to convert electric energy to kinetic energy;
a compression frame secured about the piezoelectric element and adapted to pre-compress the piezoelectric element so as to reduce tensile loads thereon, wherein the piezoelectric element and compression frame are movable;
an arm spring-biased directly against the compression frame such that the piezoelectric element converts electrical energy into kinetic energy in the form of movement of the piezoelectric element and compression frame against the arm and thereby moves the arm;
a movable drive pawl coupled with the arm and positioned so as to engage one or more of the teeth in a forward direction, wherein movement of the arm causes movement of the drive pawl, and wherein the drive pawl drives against the one or more teeth to accomplish a step-motion in the forward direction; and
a movable hold pawl positioned so as to engage one or more of the teeth in a reverse direction during movement of the drive pawl.

15. The step-motion actuator as set forth in claim 14, wherein the plurality of teeth are arranged circularly upon a wheel so as to accomplish a rotary step-motion.

16. The step-motion actuator as set forth in claim 14, wherein the plurality of teeth are arranged linearly upon a rod so as to accomplish linear step-motion.

17. The step-motion actuator as set forth in claim 14, further including a drive pawl spring coupled with the drive pawl and adapted to move and maintain the drive pawl in a position to engage the one or more teeth.

18. The step-motion actuator as set forth in claim 14, further including a hold pawl spring coupled with the hold pawl and adapted to move and maintain the hold pawl in position to engage the one or more teeth.

* * * * *